United States Patent
Oomen et al.

(10) Patent No.: US 11,427,116 B2
(45) Date of Patent: Aug. 30, 2022

(54) SUSPENSION FABRIC SEAT COOLING SYSTEM

(71) Applicant: Illinois Tool Works Inc., Glenview, IL (US)

(72) Inventors: Craig Martin Oomen, Lowell, MI (US); Randy James Sayers, Howard City, MI (US); Samuel Smith, Allendale, MI (US); Manfred Mueller, Nuremberg (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/265,467

(22) PCT Filed: Aug. 1, 2019

(86) PCT No.: PCT/US2019/044699
§ 371 (c)(1),
(2) Date: Feb. 2, 2021

(87) PCT Pub. No.: WO2020/028683
PCT Pub. Date: Feb. 6, 2020

(65) Prior Publication Data
US 2021/0339660 A1 Nov. 4, 2021

Related U.S. Application Data (60) Provisional application No. 62/714,174, filed on Aug. 3, 2018.

(51) Int. Cl.
A47C 7/74 (2006.01)
B60N 2/56 (2006.01)

(52) U.S. Cl.
CPC ........... *B60N 2/565* (2013.01); *B60N 2/5642* (2013.01)

(58) Field of Classification Search
CPC .. B60N 2/5657; B60N 2/5621; B60N 2/5642; B60N 2/565; A47C 7/282; A47C 7/74
See application file for complete search history.

(56) References Cited

U.S. PATENT DOCUMENTS 6,541,737 B1 * 4/2003 Eksin ................. B60H 1/00792
219/217
7,963,594 B2 * 6/2011 Wolas .................... A47C 7/744
297/180.13

(Continued)

FOREIGN PATENT DOCUMENTS

DE 112015001288 T5 1/2017
DE 202016005441 U1 1/2018

(Continued)

OTHER PUBLICATIONS

International Search Report and Written Opinion for PCT/US2019/044699, dated Nov. 6, 2019 (8 pages).

*Primary Examiner* — Shin H Kim
(74) *Attorney, Agent, or Firm* — Quarles & Brady LLP (57) ABSTRACT

A seat and cooling system for the seat include a porous seat surface, an air spacer disposed on a side of the seat surface that defines an air channel, a substantially air impermeable barrier having an opening therein in communication with the air channel and a blower configured to draw air through the seat surface and from the air channel. Air drawn from around an occupant on the seat surface draws moisture from the occupant, causing moisture to evaporate, to provide a cooling sensation.

20 Claims, 7 Drawing Sheets

(56) References Cited

U.S. PATENT DOCUMENTS

| | | | |
|---|---|---|---|
| 8,185,985 B2 | 5/2012 | Coffield et al. | |
| 8,191,187 B2* | 6/2012 | Brykalski | A61G 7/05769 |
| | | | 607/104 |
| 8,329,281 B2 | 12/2012 | Coffield | |
| 8,360,517 B2* | 1/2013 | Lazanja | B60N 2/5685 |
| | | | 297/180.14 |
| 8,857,033 B2 | 10/2014 | Coffield et al. | |
| 9,131,776 B2 | 9/2015 | Coffield | |
| 9,156,211 B2 | 10/2015 | Coffield | |
| 10,272,806 B2* | 4/2019 | Bauer | B60N 2/5642 |
| 10,343,565 B2* | 7/2019 | Baek | B60N 2/56 |
| 2004/0070236 A1* | 4/2004 | Brennan | B60N 2/5635 |
| | | | 297/180.13 |
| 2006/0158011 A1* | 7/2006 | Marlovits | A47C 7/02 |
| | | | 297/180.1 |
| 2006/0175877 A1* | 8/2006 | Alionte | B60N 2/5657 |
| | | | 297/180.14 |
| 2007/0246975 A1* | 10/2007 | Bier | B60N 2/5621 |
| | | | 297/180.1 |
| 2016/0009206 A1* | 1/2016 | Perraut | B60N 2/5635 |
| | | | 297/180.12 |
| 2018/0093595 A1 | 4/2018 | Kim et al. | |

FOREIGN PATENT DOCUMENTS

| | | |
|---|---|---|
| EP | 2179888 A2 | 4/2010 |
| JP | 2004008334 A | 1/2004 |
| WO | 2018039472 A1 | 3/2018 |

\* cited by examiner

SUSPENSION FABRIC SEAT COOLING SYSTEM

The present application represents the United States National Stage of International Application No. PCT/US2019/044699, filed Aug. 1, 2019, which claims priority to U.S. Provisional Patent Application No. 62/714,174, filed Aug. 3, 2018, the entire contents of which are incorporated by reference in their entirety.

BACKGROUND

The present invention relates to suspension fabric seating and more particularly, to a cooling system for suspension fabric seating.

Suspension or suspended fabrics have come into common use as an alternative to hard surfaces and foam padded surfaces for seating. Such suspension fabric seating surfaces can provide the comfort of foam padded surfaces in a weight similar to hard plastic seating and at relatively low cost. Advantageously, suspension fabric seating provides enhanced comfort using a preset tension in the suspension fabric that is adjustable for reaction force for comfort needs, provides tunable pixel element spacing and adjustable pixelated face sizes and shapes.

Vehicle seating, however, is typically of the foam-padded type, and is designed for comfort. Such foam-padded seating includes a steel structure and stamped components that are welded together to form a seating structure subassembly. A steel suspension layer that is below the occupant is added to bridge the distance between seat structure beams. The steel suspension offers some hammocking between structure pillars in the seat structure to enhance comfort characteristics. The foam padding, such as polyurethane (PU) is covers the steel structure and suspension, and offers force vs. deflection compliance during use for occupant comfort. In a typical configuration, the foam layer is covered with a trim cover that may include leather, vinyl, and/or polyester textile fabric, a lofted fabric breathable layer and felt or a bonded layer to prevent wrinkling. These layers are used generally to manage comfort requirements as well as G-forces during a crash event.

Foam, however, has disadvantages in that although it provides comfort, it is difficult to cool. Current automotive seat cooling designs use a blower motor to generate a vacuum pulling air through a manifold housed within the foam seating pad. The foam is not porous so voided channels are designed within the foam that funnel air into a spacer fabric to draw the air into the blower motor fan. Moisture from the occupant is pulled away from the body into the manifold causing moisture to evaporate, to provide a cooling sensation.

Conventional seat designs use seat covers or trim covers manufactured from leather or vinyl for aesthetics. These trim covers are inherently non-porous. Small holes are made in the trim cover surface to create air paths to draw air and moisture away from the occupant to provide the cooling function. The pierced holes can be an issue with style-focused designers because they reduce the aesthetics and reduce trim cover robustness. The holes in the trim covers are pierced as small as possible to limit the differences in appearance from cooled front row seats, to, typically, non-cooled second and third row seating.

The smaller holes also reduce air flow and require a larger, more powerful vacuum blower to achieve specified cooling levels and time to cool. These larger, more powerful blowers thus draw increased electrical current, which is a limiting factor when designing vehicle electrical systems, including alternators. This adversely affects engine horsepower available for the vehicle powertrain which ultimately affects vehicle mileage ratings. Electrical current draw is especially important when all electric powertrains are used, which rely solely on battery charge. As such, electrical current management is thus an important goal in automotive design.

Seat cooling systems are also quite complex. In addition to air/vacuum blowers, as noted above, voids in foam padding and holes in trim covers are required in order to pull air from the seat. Manifolds and spacer fabrics to protect the manifolds are needed to pull air from the foam voids to the blower. The manifolds may be formed as part of the foam void system, but may also be separate components that connect to the voids and the blower. Performance issues can occur with current cooling manifolds when the foam and/or manifolds are compressed, limiting air flow. Larger seat occupants can compress the foam and/or manifolds which can result in reduced or even no air flow for cooling.

Cooling systems also require physical space to house the manifolds for cooling function. The blower motor size is also relatively large due to the resistance to air flow. All of these factor lead to increased space needed for the system components and also add thickness to the overall seat.

Moreover, in electric vehicles that are power by batteries, the batteries are housed in a battery tray covering the vehicle floor panel. Battery trays require space (primarily height) which results in raised roof lines, or reduced thickness in the seat construction. Mileage targets are impacted by raised roof lines which increase vehicle drag and decrease vehicle aerodynamics.

Cooling systems are also known for suspension seating systems. Current suspension seating cooling system use the suspension fabric porosity to reduce the resistance to heat transfer. This enables the occupant to attain the surrounding environment temperature and humidity levels to provide cooling and body temperature regulation. One drawback to such cooling systems is that the porosity required for forced air and ambient air to cool the occupant requires holes in the suspension fabric, which has an impact on the aesthetic design of the seats.

Accordingly, there is a need for a suspension seat cooling system that has reduced complexity. Desirably, such as system uses a low profile design that includes a reduction in the size of the components of the cooling system to conserve space in the vehicle. More desirably, such a system has increased electrical efficiency to reduce the electrical requirements for the cooling system. Still more desirably, such a system eliminates the need for the spacer fabric currently needed for foam seats.

SUMMARY

In one aspect a seat and a cooling system therefor are disclosed. The seat includes a porous seat surface and an air spacer disposed on a side of the suspension seat surface. The air spacer defines an air channel. A substantially air impermeable barrier having an opening therein is in communication with the air channel and a blower is configured to draw air through the seat surface and from the air channel. The air drawn from around an occupant on the seat surface draws moisture from the occupant, causing moisture to evaporate, to provide a cooling sensation. In an embodiment, the drawn air flows parallel to the occupant's skin and as close as possible to the occupant's skin throughout the air travel, from the seat perimeter to the vacuum blower. In an embodiment the air channel or manifold is thin is close to the seat surface to maximize turbulent air flow at the occupant's skin to achieve high moisture evaporation rates.

In an embodiment, the seat surface, the air spacer and the barrier are sealed along a periphery thereof. In some embodiments, the barrier is formed as part of the air spacer. The air spacer and barrier can be formed as a polymeric member. The polymeric member can have a series of projections, and spaces between the projections define, at least in part, the air channel.

In other embodiments, the barrier is a member separate from the air spacer. In an embodiment, the air spacer is formed from polymeric filaments. In an embodiment, the air space is defined, in part, by the porous seat surface. The porous seat surface can be formed from, for example, a woven fabric material. A fabric can be woven from warp and weft fibers and the barrier can be mounted at selected locations to one of the warp and the weft fibers.

In an embodiment, the blower is mounted about the opening in the barrier. An intake spacer can be mounted to the barrier to space the blower from the barrier. A second barrier can be positioned on the intake spacer between the blower and the blower spacer.

In embodiments, the air spacer and barrier are configured to move with the seat surface when the seat surface is loaded, and the blower is mounted to move with the seat surface, air spacer and barrier.

In another aspect, a seat includes a porous seat surface, a substantially air impermeable barrier having an opening therein and an air space between the seat surface and the barrier. A vacuum source is in communication with the air space, such that air is drawn through the seat surface into the air space and from the air space by the vacuum source. The air is drawn through the seat surface and away from an occupant on the seat surface to effect cooling of the occupant.

The seat can include a voided material in the air space. In an embodiment, the impermeable barrier and the voided material are formed as a unitary member. In embodiments, the vacuum source is a blower, and the blower is mounted to move with the seat surface as the seat surface is loaded. The mount can be, for example, a suspension mount.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1:
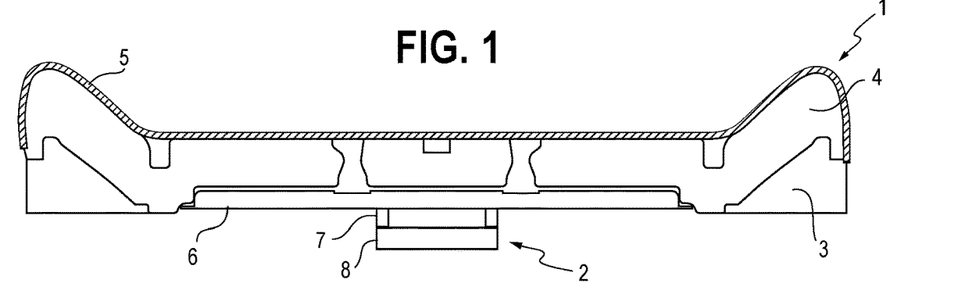
FIG. 1 is an illustration of an example of a known seat design having a cooling system.

Referring to the figures and in particular to FIG. 1, there is shown a conventional seat 1 and seat cooling system 2. The seat 1 includes a rigid frame 3, foam 4, such as polyurethane foam over the frame 3 and a seat trim 5, such as leather, vinyl, cloth or the like. The cooling system 2 includes a vacuum manifold 6 mounted to the frame 3 and/or the foam 4, a grommet 7 or like spacer and a vacuum/blower 8 mounted to the grommet.

Figure 2:
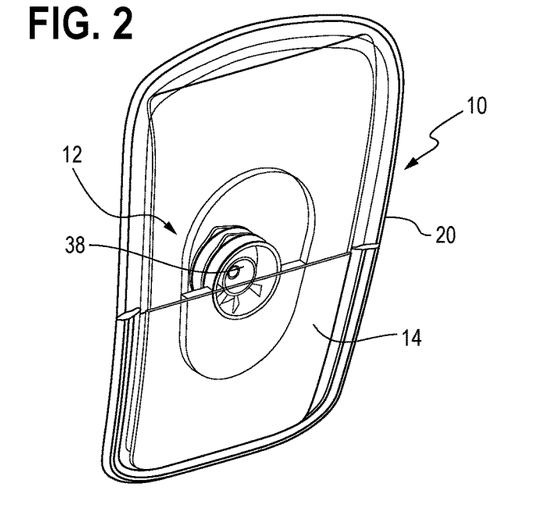
FIG. 2 is an illustration of an embodiment of a suspension fabric seat cooling system in accordance with the present disclosure, a portion of the seat fabric being removed for ease of illustration.
Figure 3:
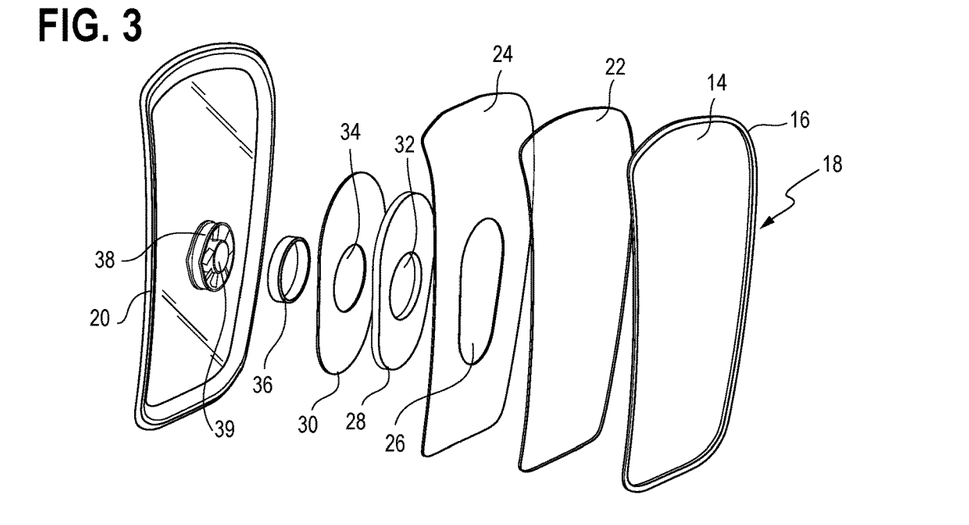
FIG. 3 is an exploded view of the suspension fabric seat cooling system of FIG. 2.

Referring now to FIGS. 2 and 3, there is shown a suspension fabric seat 10 and suspension fabric seat cooling system 12 in accordance with the present disclosure. The seat 10 includes a fabric seat surface 14 having a carrier 16 on an edge of the seat surface 14. The fabric seat surface 14 and carrier 16 form a seat surface/carrier assembly 18. The seat surface/carrier assembly 18 is positioned in a frame 20. In embodiments, the carrier 16 is overmolded onto the seat surface 14 and the frame 20 is overmolded onto the seat surface/carrier assembly 18. In other embodiments, the seat surface 14 may be mounted to the carrier 16 and the seat surface/carrier assembly 18 mounted to the frame 20 using fasteners, adhesives and the like.

An air/vacuum spacer element 22 (referred to herein as the "air spacer") is disposed adjacent to the seat surface/carrier assembly 18, and an air impermeable member or barrier 24, such as a film or other relatively air impermeable element is disposed on a side of the air spacer 22 opposite the seat surface/carrier assembly 18. The air impermeable member 24 has an opening 26 therein. It will be appreciated that the air impermeable barrier 24 is substantially air impermeable, and may not be completely impermeable. That is although air may pass through the air impermeable member 24, any air passing through or around the member 24 is negligible compared to the air the maintained by the member 24.

An intake spacer 28 is disposed on the air impermeable member 24 and a second air impermeable member 30 is disposed on the intake spacer 28. The intake spacer 28 and the second air impermeable member 30 both have openings 32, 34, respectively, therein that align with one another.

A blower mount 36 is mounted to the intake spacer 28 and the second air impermeable member 30 at their respective openings 32, 34. A blower 38, having a blower motor 39, is mounted to the blower mount 36. In an embodiment, the blower 38 functions as a vacuum and draws air away from the seat surface 14.

In an embodiment, the seat surface 14, the first and second air impermeable members 24, 30, and the intake spacer 28 are all relatively flexible so as to flex and move with the seat surface 14 as will be described in more detail herein.

Figure 5:
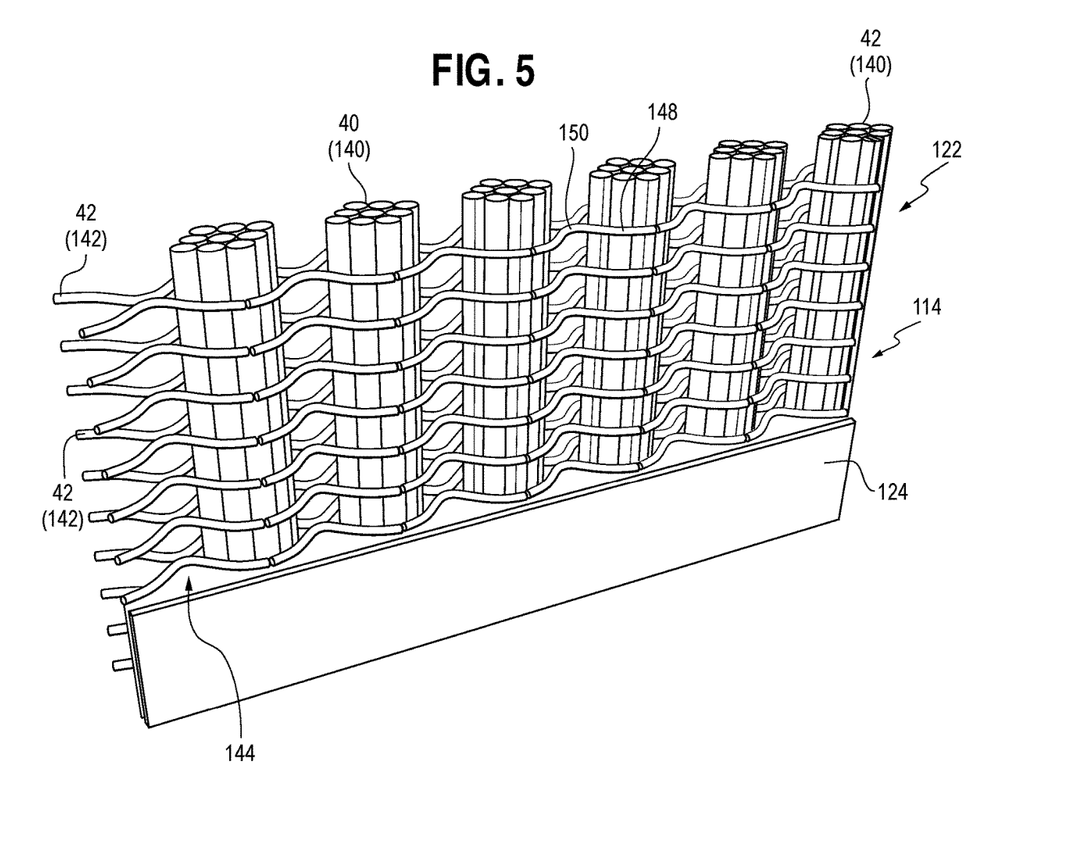
FIG. 5 is an illustration of a manifold layer spacer.

Referring briefly to FIG. 5, in an embodiment, the seat surface 14 is formed from a fabric. In an embodiment, the fabric is woven from fibers or yarns (used interchangeably herein) and includes a series of warp fibers 40, illustrated as the vertical fibers, and weft fibers 42 illustrated as the horizontal fibers. Typically, the warp fibers 40 are fill yarns and extend in the front-to-rear direction of a seat bottom surface or a top-to-bottom direction in a seat back surface or headrest. The weft fibers 42 are typically monofilament fibers that extend in a side-to-side direction transverse to the warp fibers 40. An example of a woven fabric is disclosed in Coffield, U.S. Pat. No. 8,329,281, which patent is commonly assigned with the present application, the disclosure of which is incorporated herein in its entirety. Examples of the monofilament fibers are disclosed in Coffield, et al., U.S. Pat. No. 8,857,033 and Coffield, U.S. Pat. No. 9,156,211, which patents are commonly assigned with the present application, the disclosures of which are incorporated herein in their entirety.

The warp fibers or yarns 40 are relatively inelastic and elongate less than about 12 to 15 percent and preferably, less than about 5 percent. The warp fibers 40 give the fabric bulk and thickness and are able to be colored for a colored fabric suspension assembly. The warp fibers 40 are used to shape the seat surface 14 by pulling the monofilament (weft) fibers 42 out of straight line position to form a parabolic shape in the overall fabric seat surface 14. The warp fibers 40 can be formed from, for example, a polyester yarn or like, suitable materials.

The weft fibers 42 are typically elastic and can be formed from, for example, a block copolymer monofilament. These fibers 42 can be orientated and elongate more than 10 percent, and up to about 30 percent when measured on a stress strain curve. The monofilament weft fibers 42 can be oriented and conditioned (as at an elevated temperature) and can be treated zonally to obtain a desired occupant pressure map of the seat 10 shape making the seat 10 more comfortable.

It will be appreciated that such a fabric seat surface 14 is porous so as to promote air flow through the fabric, between the fibers or yarns 40, 42.

In an embodiment, the woven seat surface 14 fabric is overmolded with the carrier 16. A carrier 16 material can be, for example, a block copolymer that is chemically similar to the fabric monofilaments (the weft fibers 42), which permits chemical bonding during the injection mold process. Mechanical bonding also takes place during overmolding. However, as noted above, in embodiments, the seat surface 14 may also be mounted to the carrier 16 using fasteners, friction fit, adhesives and the like.

Referring again to FIG. 3, the air spacer 22 is disposed on a bottom side of the seat surface 14 fabric. The air spacer 22 creates a sustained air space, channels or manifold 44 between the seat surface 14 and the first air impermeable member 24 through which air can be drawn from seat surface. The air spacer 22 can be affixed to the seat surface 14 by any of a variety of known way, such as adhesives and the like. Alternately, the air spacer 22 can "float" relative to the seat surface 14 while being maintained in place by, for example, the frame 20 or other portion of the seat 10 structure.

Figure 4:
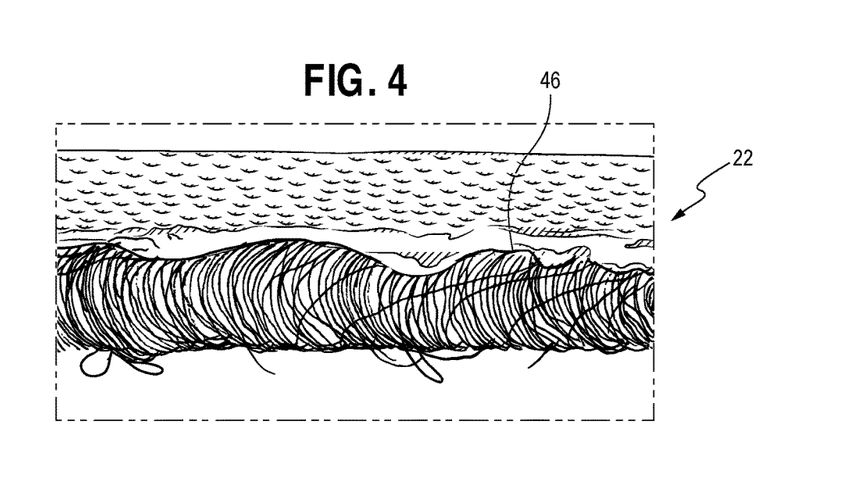
FIG. 4 is a photograph of a monofilament spacer element.

The air spacer 22 can be formed from a variety of materials. For example, as seen in FIG. 4, one embodiment of an air spacer 22 is a fiber spacer formed from, for example, monofilament fibers. A monofilament fiber material 46 is sufficiently robust that it offers limited compression, but has significant porosity creating channels for air flow, while also offering the ability to stretch and flex with the seat surface 14 without collapsing onto itself even under high and pinpoint loads.

Another embodiment of an air spacer 122 is illustrated in FIG. 5, in which the air spacer 122 is formed as part of the seat surface 114. In this embodiment, the air spacer 122 is formed by the peaks 148 and valleys 150 that are defined by the seat surface 114 fabric. In an embodiment, the peaks 148 and valleys 150 are formed by the weft fibers 142 (the monofilament fibers) that form the seat surface 114. It is anticipated that in such an embodiment, the fabric thickness will be sufficient to provide spaces between warp fibers 140 or yarns to create a manifold 144 for air flow. In this construction, the peaks 148 serve as a spacer creating the manifold 144 and control the attachment of the impermeable member 124, which is attached directly to the bottom side of the seat surface 114. The valleys 150 between the warp fiber 142 rows define the manifold 144 for air flow. The impermeable member 124 seals the manifold 144 on the bottom side of the seat surface 114 fabric, while air flow occurs toward the top side of seat surface 114 to toward the occupant. It will be appreciated that in this embodiment, the fibers of the seat surface 140, 142, and more specifically, the weft fibers 142 in the seat surface 114, along with the impermeable member 124 form the manifold 144 for proper air flow away from the occupant.

Figure 6A:
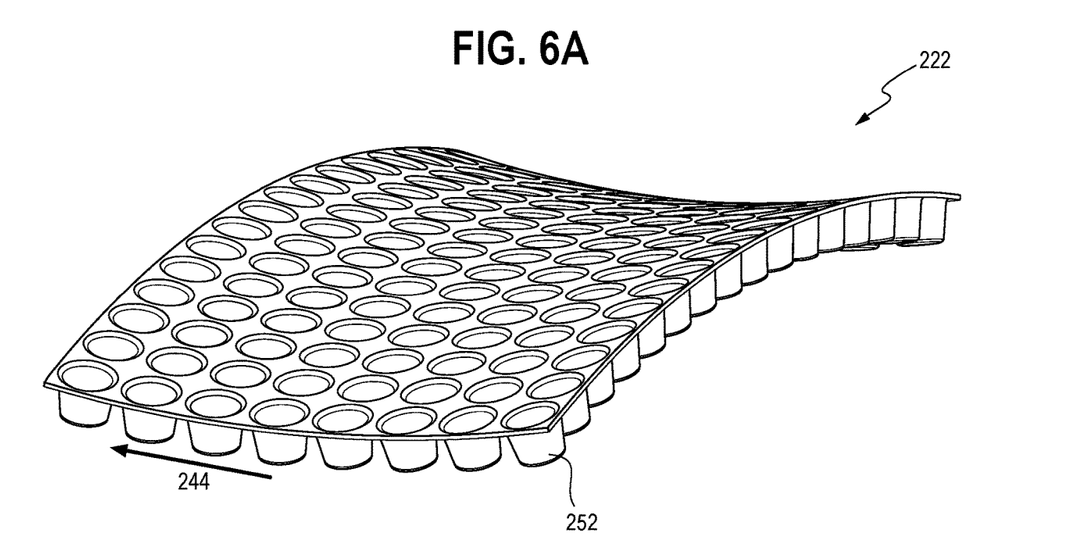
FIGS. 6A and 6B are illustrations of a molded baffle spacer element.
Figure 6B:
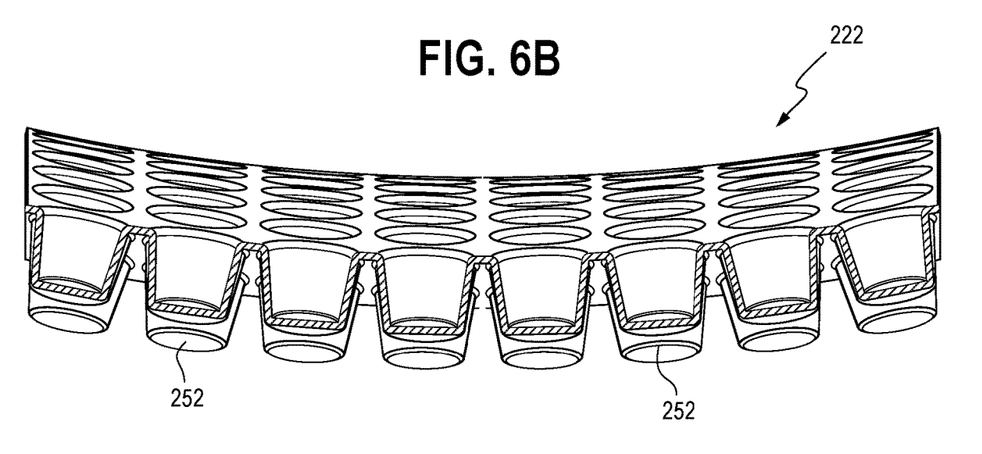

In another embodiment, illustrated in FIGS. 6A and 6B, the air spacer 222 is formed from a low durometer baffle, having a series of upstanding, compressible projections 252 that form a manifold 244. The air spacer baffle 222 can be a molded element formed from, for example, a thermoplastic elastomer (TPE) material. The baffle 222 configuration allows the manifold 244 to stretch and flex/hammock as need for comfort and further allows the baffle 222 to be attached to the bottom side of the seat surface (bot shown) fabric. The baffle 222 can be formed as a layer in a single molding or it can be formed in a two-shot molding on the suspension frame as one part molded from two materials chemically bonded to perform two independent functions. And, similar to the embodiment of FIG. 5, this embodiment of the air spacer 222 can also function as the first impermeable member.

Figure 7A:
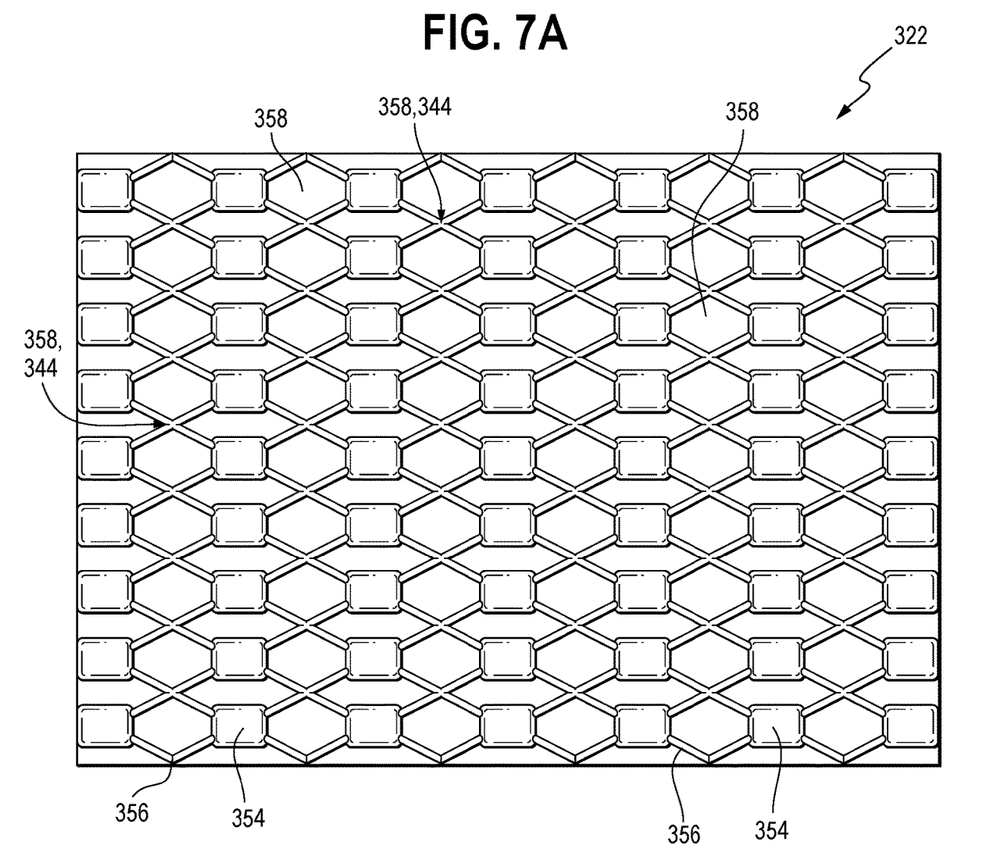
FIGS. 7A and 7B are illustrations of a molded pixelated spacer element.
Figure 7B:
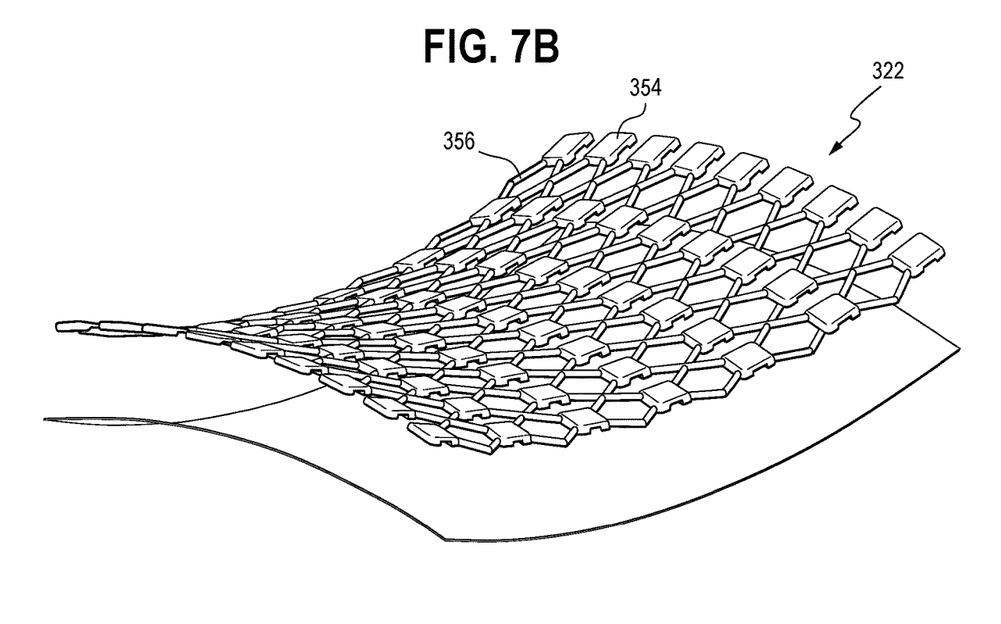

In still another embodiment, illustrated in FIGS. 7A and 7B, the air spacer 322 can be formed from an oriented polymeric member, such as that disclosed in Coffield, et al., U.S. Pat. No. 8,185,985, and Coffield, U.S. Pat. No. 9,131,776, both commonly assigned with the present application, the disclosures of which are incorporated herein in their entirety. In this embodiment, the air spacer 322 is formed from a polymeric material, such as a block copolymer, having nodes 354 and connectors 356. As can be seen in FIG. 7B, the connectors 356 are thinner than the nodes 354. As such, the spaces 358 between the connectors 356 form the manifold 344 or channels for air flow. As the polymeric member 322 is oriented, such as by stretching, the connectors 356 are oriented and stretch to a greater extent than the nodes 354, which give the polymeric member the ability to stretch and flex, while the non-oriented or less-oriented nodes 354 provide the depth necessary to maintain the space or manifold 344 between the seat surface (not shown) and the first impermeable member 324. In this embodiment, the spaces or manifold 344 between nodes 354 can be filled in with minor wall stock (not shown), while leaving the spaces between and around the connectors 356 and between the seat surface and the polymeric spacer member 322 open, so that the polymeric member is not porous, eliminating the need for a separate first impermeable member.

The first air impermeable members (referred to collectively as 24) and the second air impermeable member 30 can be formed from a wide variety of materials. The members 24, 30 are flexible and can stretch with movement of the seat surface (referred to collectively as 14). The first member 24 forms a barrier so that air is drawn from seat surface 14 (by the blower 38) through the air spacer (referred to collectively as 22), rather than from the environment around, but not through, the seat surface 14. As discussed above, some embodiments of the air spacer 22 do not require a separate first impermeable member 24 as the barrier is formed as part of the air spacer 22. The air spacer 22 includes an opening 26 through which the air is drawn by the blower 38.

The intake spacer 28 is disposed on the first air impermeable member 24 (or the air spacer 22 where the first impermeable member is formed as part of the air spacer). The intake spacer 28 forms a space between the blower mount 36 and the blower 38 to assure an air space is present between the blower 38 and the air spacer 22 and to provide a flexible area around the blower mount 36 and blower 38. The intake spacer 28 includes an opening 32 at which the blower mount 36 and blower 38 are positioned.

The second air impermeable member 30 provides a seal around the opening 26 in the first air impermeable member 24 (or the air spacer 22) and the intake spacer 28. The blower mount 36 and blower 38 are positioned at the openings 32, 34 in the intake spacer 28 and second impermeable member 30.

Figure 8A:
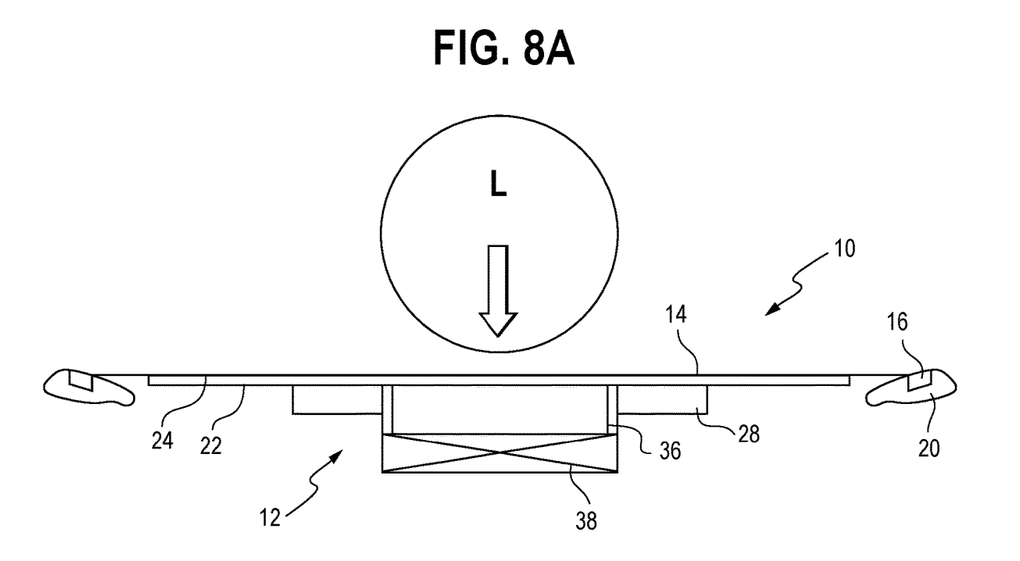
FIGS. 8A and 8B illustrate the suspension fabric seat cooling system when under no load (FIG. 8A) and under load (FIG. 8B).
Figure 8B:
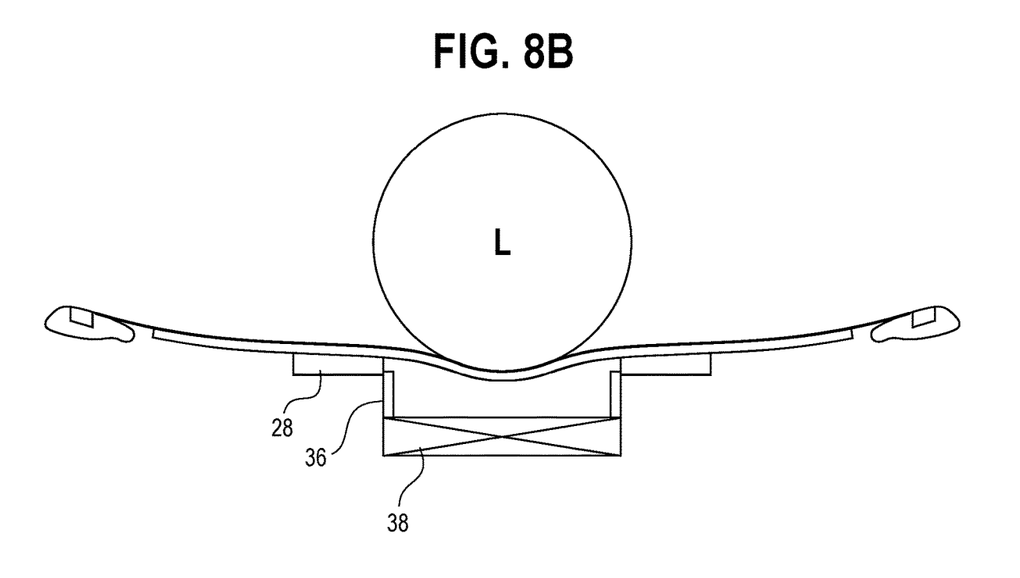

FIGS. 8A and 8B illustrate the suspension fabric seat 10 and cooling system 12 in the unloaded state (FIG. 8A) and in the loaded state (FIG. 8B). As will be appreciated, the various components or layers, such as the air spacer 22, the first impermeable member 24 (if used), the intake spacer 28 and the second impermeable member 30 all flex and move with the seat surface 14, as the seat 10 is loaded L. The blower mount 36 and blower 38 are mounted to the seat 10 by the intake spacer 28 and as such do not flex. Rather, the flex and movement is provided by the intake spacer 28. The configuration assures that the air flow path from the seat surface 14 to the blower 38 is not blocked or impeded by any of the seat 10 components, or when loaded by an occupant.

It will also be appreciated that in each of the disclosed embodiments, the air space provided by the air spacer 22 includes an impermeable back layer 24 (either as the separate first impermeable member 24 or as part of the air spacer 22) that prevents or limits air flow from unintended areas on the bottom side of the seat 10. In this manner, air flow will enter the air spacer 22 through the seat surface 14 fabric. This air flow path assures air is moving in turbulent flow very near the occupant with enough velocity to promote moisture evaporation. Moving air next to the occupant's skin offers an effective method of removing and evaporating moisture from around the occupant to provide a cooling sensation.

As an example, referring to the air spacer 22 in FIG. 3, the air spacer thickness is configured so that the air velocity is sufficient to maintain moisture evaporation and cooling from around the occupant. It is anticipated that a thickness of about 2 mm to 15 mm will provide the required performance; however, other thicknesses of the air spacer 22 will be suitable and are within the scope and spirit of the present disclosure.

In addition, the seat surface 14 and air spacers 22 are free to stretch and hammock with no compression hard points under the seat 10 structure and resulting pinching of the air spacer 22, as seen in FIGS. 8A and 8B. The spacer 22 will resist collapse, enabling the cooling function under excessive loads and pin pointed loads. The blower 38 is sufficiently spaced from the seat surface 14 to prevent air path blockage and possible air path collapse. The blower spacer 28 material is an additional layer used to prevent localized loading near the blower 38 intake. It is also anticipated that the blower 38 location can be moved to, for example, a hinge point on the seat 10, to eliminate any risk of blocking or collapsing the air path and to eliminate or reduce the need for the blower spacer 28.

In the disclosed embodiments, the air flow channel or manifold 44 does not impede the suspension hammocking effect of the seat surface 14, and as such, occupant comfort is enhanced because the seat surface 14 and manifold 44 move as one under load, as illustrated in FIG. 8B. The blower 38 provides a vacuum for air and moisture evaporation that can be attached directly to the seat surface 14 and manifold 44 assembly.

Blower 38 noise, typically associated with the blower motor 39 can be reduced because the seat surface 14 is suspended, isolating the motor 39 from vehicle hard points, thus reducing fan and motor vibration noise.

As noted above and as seen in FIGS. 8A and 8B, the seat 14 and manifold 44 assembly does not collapse under point loads or high loads because the seating surface 14, manifold 44 and blower 38 and motor 39 move all as one avoiding contact with hard points that would otherwise collapse the manifold (air paths) 44.

It will be appreciated that, the drawn air flows parallel to the occupant's skin and as close as possible to the occupant's skin throughout the air travel, from the seat surface 14 perimeter to the vacuum blower 38. In embodiments, the air channel or manifold 44 is sufficiently thin and is close to the seat surface 14 to maximize turbulent air flow at the occupant's skin to achieve high moisture evaporation rates.

It will also be appreciated that, although not shown, sensors, monitors and controls can be integrated into the cooling system 12 to, for example, monitor the temperature at certain locations within the system 12 and the seat 10, to monitor the blower 38 fan speed and time, monitor humidity levels and the like. Accordingly, temperature sensors such as thermocouples, humidistats, current and voltage sensors and the like can be incorporated into the system 10 as desired. As one example, thermocouples or other temperature sensors can be incorporated into the fibers 40, 42 of the seat surface.

In the present disclosure, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

We claim:

1. A seat, comprising:
   a porous seat surface suspended from a carrier, the seat surface being secured to the carrier along an edge of the seat surface;
   an air spacer disposed on a side of the seat surface, the air spacer defining an air channel;
   a substantially air impermeable barrier having an opening therein in communication with the air channel; and a blower configured to draw air through the seat surface and from the air channel, wherein at least one of the air spacer and the barrier are configured to move and flex with the seat surface when the seat surface is loaded.

2. The seat of claim 1, wherein the seat surface, the air spacer and the barrier are sealed along a periphery thereof.

3. The seat of claim 1, wherein the barrier is formed as part of the air spacer.

4. The seat of claim 3, wherein the air spacer and barrier are formed as a polymeric member.

5. The seat of claim 4, wherein the polymeric member has a series of projections, and wherein spaces between the projections define, at least in part, the air channel.

6. The seat of claim 1, wherein the barrier is a member separate from the air spacer.

7. The seat of claim 6, wherein the air spacer is formed from polymeric filaments.

8. The seat of claim 6, wherein the air space is defined, in part, by the porous seat surface.

9. The seat of claim 8, wherein the porous seat surface is formed from a woven fabric material.

10. The seat of claim 1, wherein the fabric is formed from warp and weft fibers and wherein the barrier is mounted at selected locations to one of the warp and the weft fibers.

11. The seat of claim 1, wherein the blower is mounted about the opening in the barrier.

12. The seat of claim 1, wherein the blower is suspended from the barrier.

13. The seat of claim 10 including an intake spacer mounted to the barrier to space the blower from the barrier.

14. The seat of claim 13 including a second barrier positioned on the intake spacer between the blower and the blower spacer.

15. The seat of claim 1, wherein the blower is mounted to move with the seat surface, air spacer and barrier.

16. A seat, comprising:

a porous seat surface defining an edge, the seat surface being secured to a carrier along the edge so that the seat surface is suspended from the carrier;

a substantially air impermeable barrier having an opening therein;

an air spacer defining an air space between the seat surface and the barrier; and a vacuum source in communication with the air space, wherein air is drawn through the seat surface into the air space and from the air space by the vacuum source, the air drawn through the seat surface and away from an occupant on the seat surface to effect cooling of the occupant.

17. The seat of claim 16 including a voided material in the air space.

18. The seat of claim 17, wherein the impermeable barrier and the voided material are formed as a unitary member.

19. The seat of claim 16, wherein the vacuum source is a blower, and wherein the blower is mounted to move with the seat surface as the seat surface is loaded.

20. The seat of claim 19, wherein the blower is suspension mounted.

* * * * *